US012618452B2

(12) United States Patent
Wang et al.

(10) Patent No.: US 12,618,452 B2
(45) Date of Patent: May 5, 2026

(54) MOBILE PHOTOGRAPHY SHOCK ABSORPTION SYSTEM

(71) Applicant: Hunan Guangmo Technology Co., Ltd., Changsha (CN)

(72) Inventors: Huan Wang, Changsha (CN); Shaobo Wang, Changsha (CN)

( * ) Notice: Subject to any disclaimer, the term of this patent is extended or adjusted under 35 U.S.C. 154(b) by 168 days.

(21) Appl. No.: 18/743,710

(22) Filed: Jun. 14, 2024

(65) Prior Publication Data

US 2025/0383007 A1     Dec. 18, 2025

(51) Int. Cl.
| | |
|---|---|
| *F16F 15/02* | (2006.01) |
| *F16M 13/02* | (2006.01) |
| *G03B 17/56* | (2021.01) |

(52) U.S. Cl.
CPC ......... *F16F 15/022* (2013.01); *F16M 13/022* (2013.01); *G03B 17/561* (2013.01)

(58) Field of Classification Search
CPC ...... H04N 23/50; H04N 23/51; G03B 17/561; F16M 13/022; F16M 13/00; F16F 15/022; F16F 15/02
See application file for complete search history.

(56) References Cited

U.S. PATENT DOCUMENTS

| | | | |
|---|---|---|---|
| 2016/0105592 A1* | 4/2016 | Dispenza | H04N 5/2251 |
| | | | 29/428 |
| 2018/0037172 A1* | 2/2018 | Nelson | F16M 11/2092 |
| 2018/0299751 A1* | 10/2018 | Teichman | F16M 11/2092 |
| 2023/0104235 A1* | 4/2023 | Li | B64U 20/87 |
| | | | 396/419 |
| 2024/0085767 A1* | 3/2024 | Zeng | F16M 11/00 |
| 2025/0102889 A1* | 3/2025 | Luo | G03B 17/561 |
| 2025/0298295 A1* | 9/2025 | Franco | G03B 17/561 |

* cited by examiner

*Primary Examiner* — Kelly L Jerabek

(57)     ABSTRACT

The invention discloses a mobile photography shock absorption system, comprising a shock absorption arm main body and a shock absorption head, and the shock absorption head is connected to the shock absorption arm main body; the shock absorption arm main body is installed with a shock absorber, and the end of the shock absorption arm main body is installed with an image transmission bracket; the lower part of the image transmission bracket is installed with a horizontal shock absorption head, and the bottom of the horizontal shock absorption head is installed with a suspension shock absorption system; the shock absorption arm main body is detachably connected with a double-sided dovetail slide plate. The above structure can be applied to camera equipment of different weights, saving more time and effort. On the other hand, compressed air is used to buffer and absorb energy.

8 Claims, 6 Drawing Sheets

MOBILE PHOTOGRAPHY SHOCK ABSORPTION SYSTEM

1. TECHNICAL FIELD

The invention relates to the technical field of robotic arms, and specifically refers to a mobile photography shock absorption system.

2. BACKGROUND ART

When moving the lens indoors or outdoors to shoot sports scenes, in order to keep the images captured by the camera stable and smooth, it is usually necessary to use some camera shock absorption devices to maintain the stability of the images captured by the camera. In the prior art, the shock absorption device for cameras usually uses springs as buffering and energy absorption components. Using springs as buffering components has the following disadvantages: 1. when the shock absorption device needs to be adapted to machines of different weights, the springs usually need to be replaced, and the springs on both sides of the shock absorption device need to be adjusted to the same tightness; replacing the springs is time-consuming and laborious; 2. the life of the springs is limited; after a period of high-frequency use, stress relaxation occurs easily, resulting in poor stability.

3. SUMMARY OF THE INVENTION

In order to solve the above technical problems, the technical solutions provided by the invention are: a mobile photography shock absorption system, comprising a shock absorption arm main body and a shock absorption head, and the shock absorption head is connected to the shock absorption arm main body; the shock absorption arm main body is installed with a shock absorber, and the end of the shock absorption arm main body is installed with an image transmission bracket; the lower part of the image transmission bracket is installed with a horizontal shock absorption head, and the bottom of the horizontal shock absorption head is installed with a suspension shock absorption system; the shock absorption arm main body is detachably connected with a double-sided dovetail slide plate;

the double-sided dovetail slide plate is detachably connected with a first dovetail slider, a second dovetail slider, and a third dovetail slider; the shock absorption arm main body is connected to the double-sided dovetail slide plate through the first dovetail slider; the second dovetail slider is installed with an angle rotation connecting rod bracket, and the end of the angle rotation connecting rod bracket away from the second dovetail slider is installed with a plurality of first suction cups; the third dovetail slider is installed with a plurality of second ball journal suction cups; the first suction cups and the second ball journal suction cups are used to fix the above mobile photography shock absorption system.

Further, the shock absorber is a coiled spring shock absorber or other elastic object.

Further, the first dovetail slider, the second dovetail slider, and the third dovetail slider have the same structure, and the first dovetail slider is provided with a detent rod and a detent pin.

Further, the first suction cup and the second ball journal suction cup have the same structure, and both are provided with two groups; a connecting crossbar is installed between the two groups of first suction cups, and the connecting crossbar is provided with a handle and a lock nut; the first suction cup is provided with three structures.

The advantages of the invention compared with the existing technology are:

The invention adopts a combination of multiple structures such as a shock absorption arm main body, a shock absorption head, a shock absorber, a double-sided dovetail slide plate, dovetail sliders, suction cups, and an angle rotation connecting rod bracket to provide a mobile photography shock absorption system. The above shock absorption system can be used for mobile shooting in the fields of cars, motorcycles, airplanes and boats, etc. The above structure can be applied to camera equipment of different weights, saving more time and effort. On the other hand, compressed air is used to buffer and absorb energy, without the problem of stress relaxation and reduced shock absorption effect like springs. The rear of the arm is optionally equipped with a hydraulic rebound buffer to relieve the force of the large upward swing of the arm.

Various brackets can be fixed at multiple angles and dimensions, which solves the problem that the static fixed torque of the locked joint does not decay under the condition of long-term use and wear. Two axial angle adjustments can be added through a 90-degree adapter.

4. BRIEF DESCRIPTION OF ACCOMPANY DRAWINGS

5. SPECIFIC EMBODIMENT OF THE INVENTION

Figure 1:
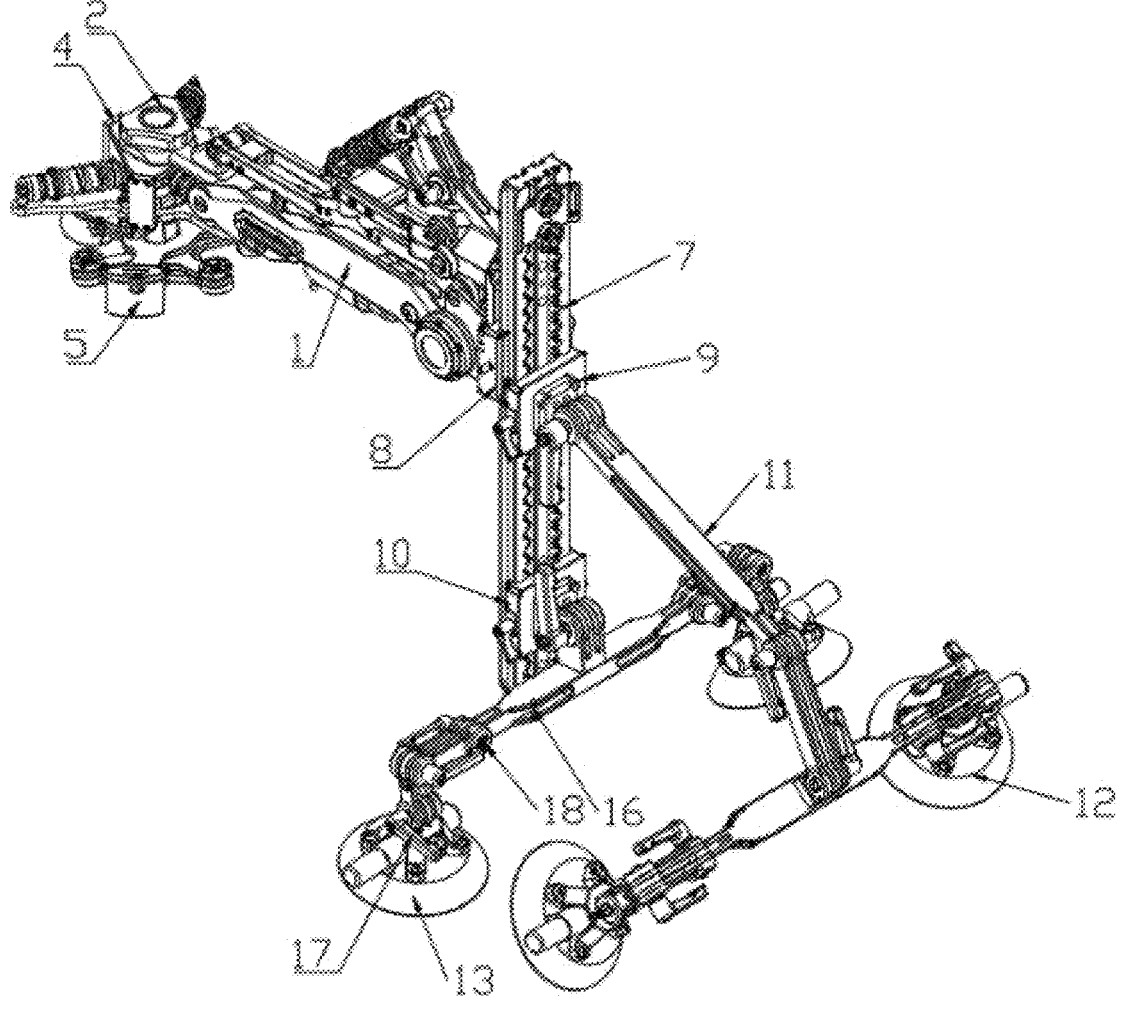
FIG. 1 is a first schematic structural diagram of the mobile photography shock absorption system according to the invention.
Figure 2:
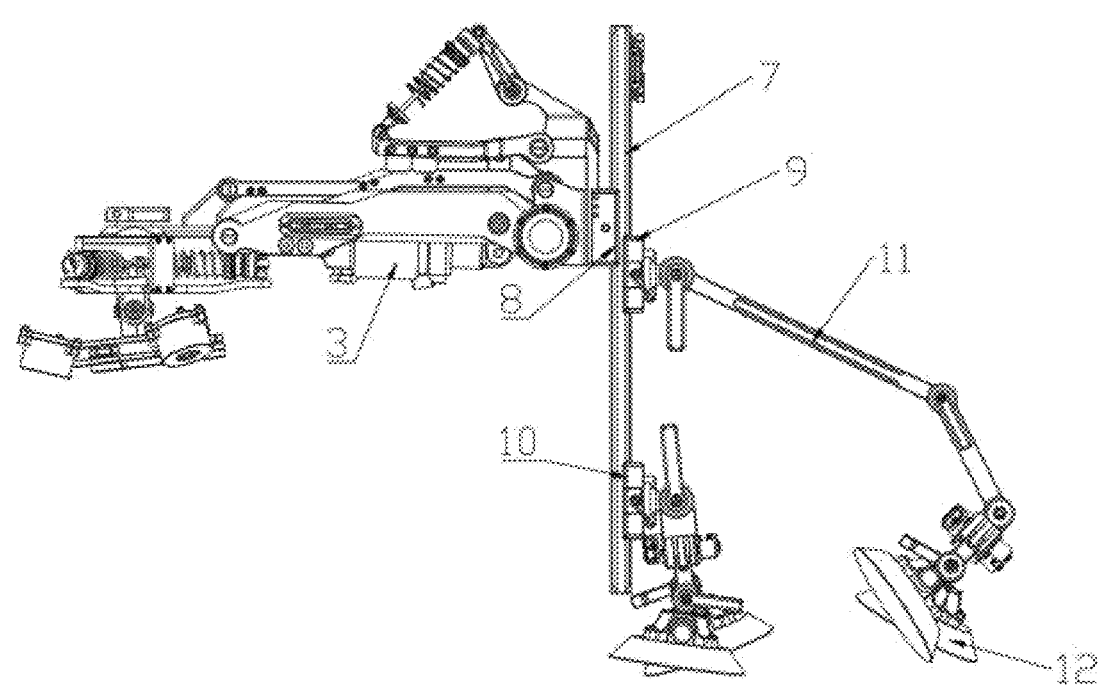
FIG. 2 is a second schematic structural diagram of the mobile photography shock absorption system according to the invention.
Figure 3:
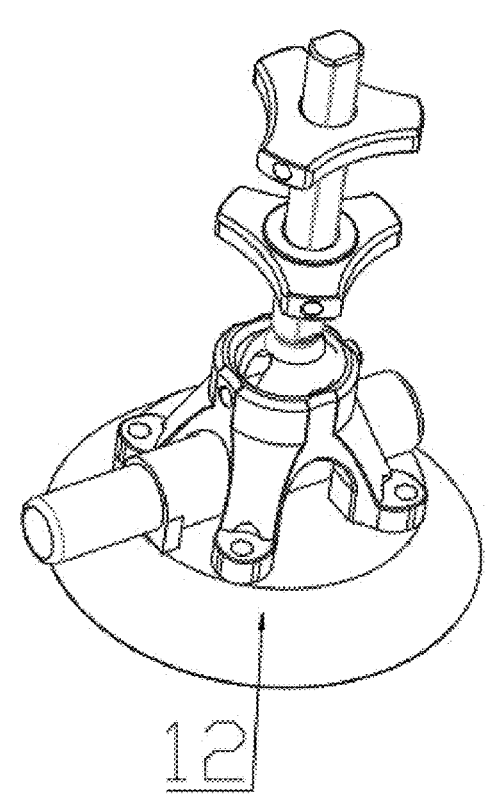
FIG. 3 is a second schematic structural diagram of the ball journal suction cup according to the invention.
Figure 4:
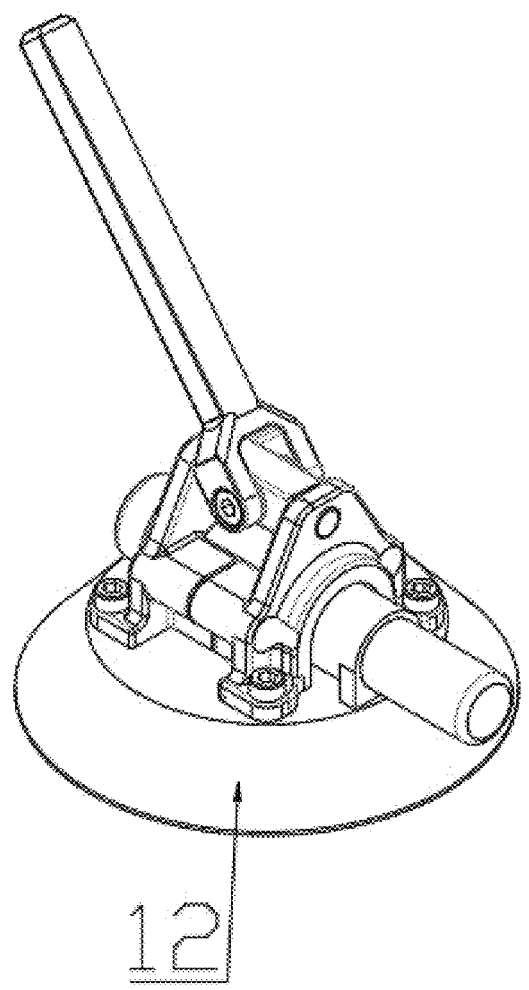
FIG. 4 is a second schematic structural diagram of the cross shaft suction cup according to the invention.

The invention will be described in detail with reference to the drawings.

When the invention is in specific implementation: a mobile photography shock absorption system, comprising a shock absorption arm main body 1 and a shock absorption head 2, and the shock absorption head 2 is connected to the shock absorption arm main body 1; the shock absorption arm main body 1 is installed with a shock absorber 3, and the end of the shock absorption arm main body 1 is installed with an image transmission bracket 4; the lower part of the image transmission bracket 4 is installed with a horizontal shock absorption head 5, and the bottom of the horizontal shock absorption head 5 is installed with a suspension shock absorption system 6; the shock absorption arm main body 1 is detachably connected with a double-sided dovetail slide plate 7;

the double-sided dovetail slide plate 7 is detachably connected with a first dovetail slider 8, a second dovetail slider 9, and a third dovetail slider 10; the shock absorption arm main body 1 is connected to the double-sided dovetail slide plate through the first dovetail slider 8; the second dovetail slider 9 is installed with an angle rotation connecting rod bracket 11, and the end of the angle rotation connecting rod bracket 11 away from the second dovetail slider 9 is installed with a plurality of first suction cups 12; the third dovetail slider 10 is installed with a plurality of second ball journal suction cups 13; the first suction cups 12 and the second ball journal suction cups 13 are used to fix the above mobile photography shock absorption system.

The shock absorber 3 is one of an air shock absorber system or a hydraulic spring shock absorber.

The first dovetail slider 8, the second dovetail slider 9, and the third dovetail slider 10 have the same structure, and the first dovetail slider 8 is provided with a detent rod 14 and a detent pin 15.

The first suction cup 12 and the second ball journal suction cup 13 have the same structure, and both are provided with two groups; a connecting crossbar 16 is installed between the two groups of first suction cups 12, and the connecting crossbar 16 is provided with a handle 17 and a lock nut 18; the first suction cup 12 is provided with three structures, namely, a suction cup with a separate friction plate, a cross shaft suction cup, and a ball journal suction cup.

Embodiment (1) The shock absorption arm main body adopts 0-300 Psi air shock absorber rebound damping multi-level adjustment, which is convenient for quick adjustment under different weights.

(2) The horizontal shock absorption of the shock absorber head adopts the star engine cylinder distribution principle and cooperates with the hydraulic cylinder to generate damping. Free movement in the horizontal direction is achieved through the cross shaft in the middle. The upper hydraulic cylinder balances the horizontal vibration and inertia of the lower stabilizer.

(3) The shock absorption tank is made of honeycomb silicone pads to isolate the high-frequency vibration of the picture, and the vertical extension line of the central axis of the silicone pad is inclined inward at a centripetal angle of 20 degrees.

(4) The air shock absorber uses pivot points and pulling rods to change the shock absorption working direction and working stroke to absorb large vibrations in the vertical direction.

(5) The double-sided dovetail slide plate, combined with double-sided dovetail groove, can be connected in reversing direction. The double-sided dovetail slide plate has toothed safety guide rails on both sides. When the locking mechanism is loose or accidentally opened, a second protective lock can be achieved. Full movement is only possible by pressing and holding the safety rail release locating pin. The double-sided dovetail groove adopts a double locking structure, with multiple locks and multiple protections. The dovetail ecosystem expanded with double-sided dovetail plates includes dovetail arm connectors, dovetail battery connectors, dovetail suction cup connectors, etc. This system does not require any tools to install and is easy to mount outdoors with bare hands.

(6) The cross shaft suction cup and the universal ball head can quickly adapt to the carrier surface with curvature in any direction, and the adsorption angle of the overall bracket and shock-absorbing arm is fine-tuned through the rear-end screw structure to keep the shock absorber arm parallel to the ground. The middle cross shaft has two structures: coaxial and non-coaxial.

(7) The joint adopts multi-plate clutch superposition, and rotation and locking are achieved through thrust bearing compression and separation. There are two outermost clutch plates, one sinks into the thrust bearing and the other sinks into the hexagonal loosening nut. The handle screw rotates with the hexagonal nut to push the clutch plate structure to compress the joint to generate static friction to lock the angle.

(8) The back of the arm can be equipped with a hydraulic shock absorber or a limiter made of other elastic objects to prevent the arm from violently hitting the equipment upwards when passing on an undulating road surface.

(9) The invention integrates power supply for multiple devices and special installation locations to facilitate long-term operation of electronic equipment such as follow focus cameras and wireless transmission.

Among them, structures such as the shock absorption arm main body and the shock absorption head are technical features that have been disclosed by those skilled in the art and will not be described in detail by the applicant.

Figure 5:
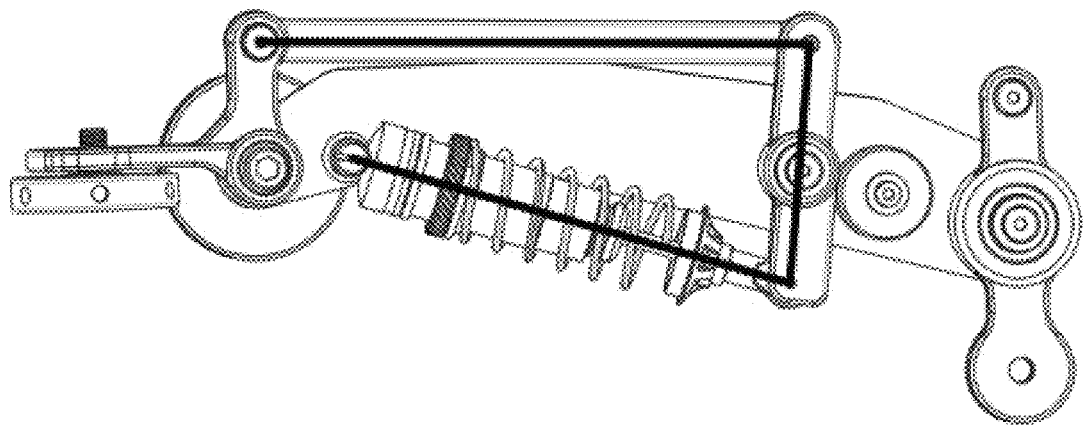
FIG. 5 is a first schematic diagram of the geometric rotation point of the mobile photography shock absorption system according to the invention.
Figure 6:
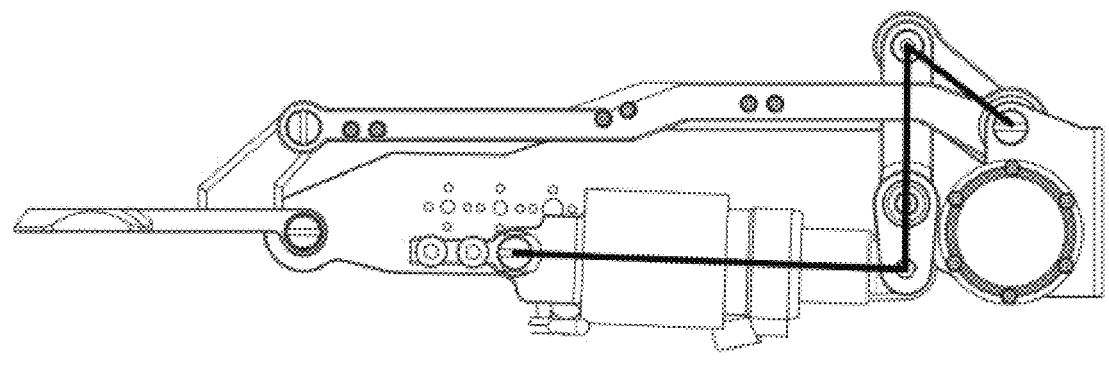
FIG. 6 is a second schematic diagram of the geometric rotation point of the mobile photography shock absorption system according to the invention.
Figure 7:
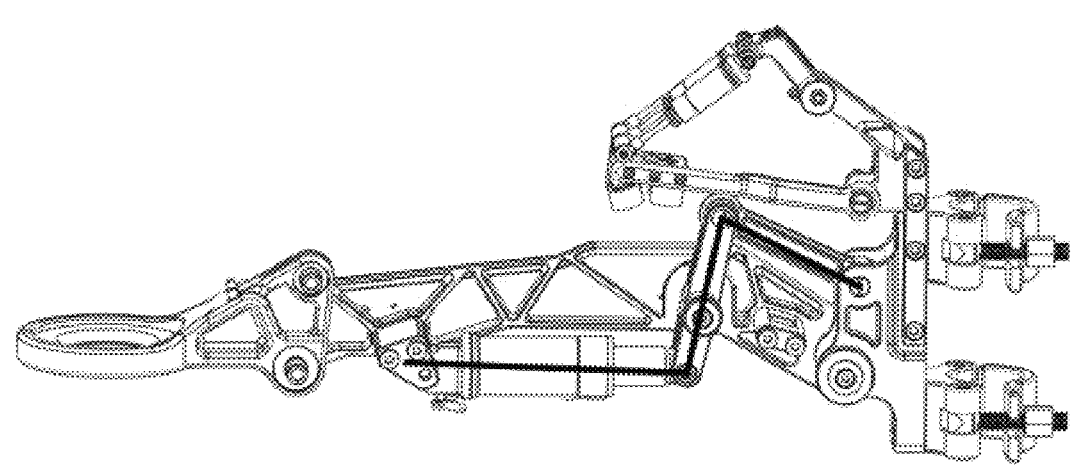
FIG. 7 is a third schematic diagram of the geometric rotation point of the mobile photography shock absorption system according to the invention.
Figure 8:
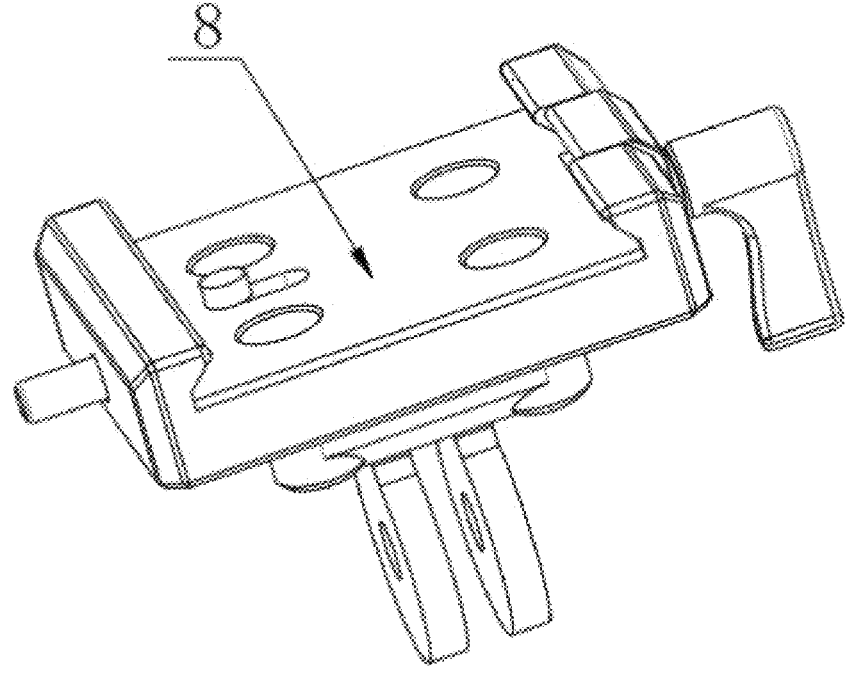
FIG. 8 is a second schematic structural diagram of the dovetail slider according to the invention.
Figure 9:
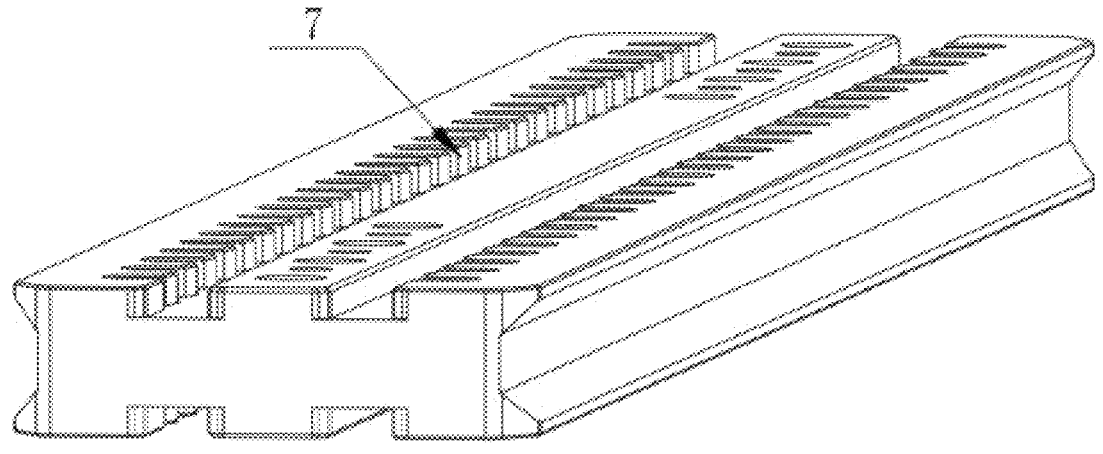
FIG. 9 is a second schematic structural diagram of the double-sided dovetail slide plate according to the invention.
Figure 10:
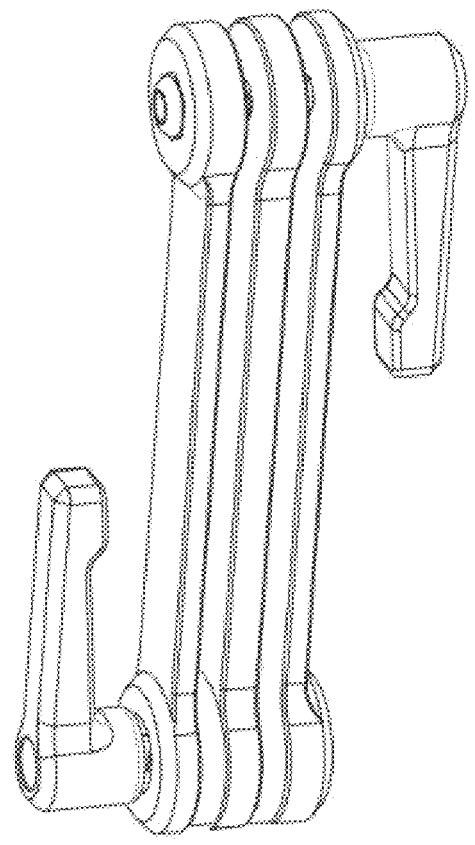
FIG. 10 is a second schematic structural diagram of the separate friction disc according to the invention.

FIGS. 5-7 are schematic diagrams of three geometric rotation points of the invention, all of which convert the horizontal deformation of the spring into vertical shock absorption through the geometric deformation of the pulling rod.

The invention claimed is:

1. A mobile photography shock absorption system, comprising a shock absorption arm main body and a shock absorption head, and the shock absorption head is connected to the shock absorption arm main body; the shock absorption arm main body is installed with a shock absorber, and the end of the shock absorption arm main body is installed with an image transmission bracket; the lower part of the image transmission bracket is installed with a horizontal shock absorption head, and the bottom of the horizontal shock absorption head is installed with a suspension shock absorption system; the shock absorption arm main body is detachably connected with a double-sided dovetail slide plate;

the double-sided dovetail slide plate is detachably connected with a first dovetail slider, a second dovetail slider, and a third dovetail slider; the shock absorption arm main body is connected to the double-sided dovetail slide plate through the first dovetail slider; the second dovetail slider is installed with an angle rotation connecting rod bracket, and the end of the angle rotation connecting rod bracket away from the second dovetail slider is installed with a plurality of first suction cups; the third dovetail slider is installed with a plurality of second ball journal suction cups; the first suction cups and the second ball journal suction cups are used to fix the above mobile photography shock absorption system.

2. The mobile photography shock absorption system of claim 1, wherein the shock absorber is one of an air shock absorber system or a hydraulic spring shock absorber.

3. The mobile photography shock absorption system of claim 1, wherein the first dovetail slider, the second dovetail slider, and the third dovetail slider have the same structure, and the first dovetail slider is provided with a detent rod and a detent pin.

4. The mobile photography shock absorption system of claim 3, wherein the first suction cup and the second ball journal suction cup have the same structure, and both are provided with two groups; a connecting crossbar is installed between the two groups of first suction cups, and the connecting crossbar is provided with a handle and a lock nut; the first suction cup is provided with three structures.

5. The mobile photography shock absorption system of claim 1, wherein the shock absorption head comprises a connecting bracket, a star-shaped horizontal shock absorption mechanism, a cross shaft mechanism, and a camera equipment mounting bracket; the connecting bracket is connected to the shock absorption arm main body; the star-shaped horizontal shock absorption mechanism comprises a plurality of hydraulic dampers and a support base for installing the hydraulic dampers; the connecting bracket is connected to the support base through a connecting support; the hydraulic dampers are arranged in a star-shaped arrangement on the support base, and the telescopic rod of the hydraulic damper is hinged to the cross shaft mechanism; the cross shaft mechanism is provided between the support base and the camera equipment mounting bracket, and the camera equipment mounting bracket is installed with a shock absorption tank; the cross shaft mechanism comprises a first pivot and a second pivot arranged perpendicularly and horizontally to each other, the first pivot is rotatably connected to the support base, and the second pivot is rotatably connected to the camera equipment mounting bracket; the camera equipment mounting bracket is used to install camera equipment.

6. The mobile photography shock absorption system of claim 5, wherein the support base is provided with a connection support that is rotated with the first pivot, and the first pivot is rotatably mounted on the connection support through a bearing; the mounting bracket is provided with a mounting support that is rotated with the second pivot, and the second pivot is rotatably mounted on the mounting support through a bearing; the support base is provided with a through hole that allows the mounting support to pass through; the upper part of the mounting support is provided with connecting parts hinged with the hydraulic dampers; the support base is evenly provided with three hydraulic dampers, and the three hydraulic dampers are arranged in a star-shaped divergent shape around the mounting support; the connecting parts are three connecting shafts arranged on the top of the mounting support, and a rotational connection is formed between the hydraulic damper and the corresponding connecting shaft; the camera equipment mounting bracket comprises a connecting plate and a mounting plate; the mounting plate is used to install camera equipment, and the connecting plate is rotatably connected to the second pivot; the connecting plate is installed with a plurality of the shock absorption tanks; the opening of the shock absorption tank faces the connecting plate, and the side wall of the shock absorption tank is provided with a through groove extending along the axis of the shock absorption tank; the mounting plate is provided with the same number of support blocks as the shock absorption tanks, and the support block extends into the corresponding shock absorption tank through the corresponding through groove; honeycomb silicone pads are provided between the support block and the bottom of the shock absorption tank and between the support block and the connecting plate; there is an included angle between the central axis of the shock absorption tank and the axis of the shock absorption head, and the included angle is 20°.

7. The mobile photography shock absorption system of claim 6, wherein the connecting bracket comprises a transition plate, a central base, a fixing nut, and a support plate; the transition plate is fixedly connected to the shock absorption arm main body, and the outer surface of the lower end of the central base is connected to the support plate; the transition plate is sleeved around the periphery of the central base and abuts against the support plate; the fixing nut is threaded with the central base and is arranged above the transition plate to press the transition plate toward the support plate; the support plate and the support base are connected through the connecting support.

8. The mobile photography shock absorption system of claim 7, wherein the shock absorption arm main body comprises a support linkage mechanism and a buffer linkage mechanism; the support link mechanism comprises a base, a first linkage, a second linkage, and an intermediate linkage; the base is provided with a fixing part for connecting to other components; one end of the first linkage is hinged to the base, the other end of the first linkage is hinged to one end of the intermediate linkage, and the other end of the intermediate linkage is hinged to the second linkage; the end of the second linkage away from the intermediate linkage is hinged to the base, and the base, the first linkage, the second linkage, and the intermediate linkage form a parallelogram structure; the buffer linkage mechanism comprises a third linkage and a fourth linkage; one end of the third linkage is hinged to the base, and the other end of the third linkage is hinged to the fourth linkage; the middle part of the fourth linkage is hinged to the second linkage, the end of the fourth linkage away from the third linkage is hinged to one end of the air shock absorber, and the other end of the air shock absorber is hinged to the second linkage; the intermediate linkage is connected to the connecting bracket of the shock absorption head; the number of the second linkage is two; one end of the second linkage is hinged to the intermediate linkage, and the other end of the second linkage is hinged to the base; the first linkage and the third linkage are located between the two second linkages.

* * * * *